(12) United States Patent
Wu

(10) Patent No.: US 8,978,255 B2
(45) Date of Patent: Mar. 17, 2015

(54) GARDEN SHEARS

(71) Applicant: Jiin Haur Industrial Co., Ltd., Chang Hua Hsien (TW)

(72) Inventor: Shih-Piao Wu, Chang Hua Hsien (TW)

(73) Assignee: Jiin Haur Industrial Co., Ltd., Changhua (TW)

( * ) Notice: Subject to any disclaimer, the term of this patent is extended or adjusted under 35 U.S.C. 154(b) by 166 days.

(21) Appl. No.: 13/662,521

(22) Filed: Oct. 28, 2012

(65) Prior Publication Data

US 2014/0115902 A1 May 1, 2014

(51) Int. Cl.
*B26B 13/26* (2006.01)

(52) U.S. Cl.
USPC .............................................. 30/185; 30/243

(58) Field of Classification Search
CPC .............................. A01G 3/0251; B26B 13/26
USPC ............ 30/182–185, 241–243, 349, 260–262
See application file for complete search history.

(56) References Cited

U.S. PATENT DOCUMENTS

| 472,139 | A | * | 4/1892 | Newton | 30/243 |
| 480,246 | A | * | 8/1892 | Brosius | 30/243 |
| 2,063,785 | A | * | 12/1936 | Bernard | 30/243 |
| 7,530,172 | B1 | * | 5/2009 | Wu | 30/252 |
| 2012/0137527 | A1 | * | 6/2012 | Huang | 30/185 |

* cited by examiner

*Primary Examiner* — Kenneth E. Peterson
*Assistant Examiner* — Nhat Chieu Do
(74) *Attorney, Agent, or Firm* — Che-Yang Chen; Law Office of Michael Chen

(57) ABSTRACT

Garden shears has a pair of overlapped engaging members, an anvil, a blade plate and two operating arms. The engaging member has a plurality of positioning apertures, at least two pivoting apertures, and a containment space. The engaging member has two parallel protruding strips which form a guiding track in between. The blade plate has a positioning slot, a blade and an extending portion. A plurality of driving teeth are formed at two sides of the extending portion. A limiting member is respectively mounted onto both sides of the extending portion and slidably engages with the guiding track of the engaging member. The operating arm has a connecting aperture at one end, and a driving portion adjacent to the connecting aperture. An arced section with the driving portion is provided with corresponding teeth, and another of the operating arm is provided with a handle.

4 Claims, 10 Drawing Sheets

GARDEN SHEARS

BACKGROUND OF THE INVENTION

1. Field of the Invention

The present invention relates to garden shears, and more particularly to garden shears having two operating arms.

2. Description of the Related Art

Since branches are suspended in midair, garden shears are a better choice for pruning branches rather than a handsaw. Some branches are, however, too thick and may be located at high positions, and as a result garden shears operated with a simple shearing action are unsatisfactory in this situation because the user has to exert a large force for pruning such branches. Thus, manufacturers in this art propose garden shears having a labor-saving mechanism to make the pruning action easier. However, existing garden shears having a labor-saving mechanism have a complicated structure, and so the production and assembly thereof requires significant time and work, which inevitably raises production costs.

Typical garden shears 80, as shown in FIG. 7 and FIG. 8, comprise two cutting members 81, an anvil 82, a supporting plate 83, a blade plate 84, an operating arm 85, a spring 86 and a plurality of locking elements 87, 88. The cutting member 81 has more than two positioning apertures 811, a containment space 812 with an opening and a top end 813, a connecting aperture 814 adjacent to the two positioning aperture 811. The cutting member 81 further has a connecting section 815 and a securing aperture 816 with a corresponding securing pin 817 at a lower portion. The anvil 82 is designed corresponding with the cutting member 81 and the blade plate 84. The supporting plate 83 has a positioning aperture 831 and a connecting aperture 832 corresponding to the positioning aperture 811 and the connecting aperture 814 of the cutting member 81. The blade plate 84 has a blade 841, the positioning slot 842 and driving teeth 843. The blade plate 84 further has a positioning aperture 844. The operating arm 85 has a connecting aperture 851 at one end, an arced section of corresponding teeth 852 and a rotating arm 853 at another end. One end of the spring 86 is secured with the cutting member 81, another end is secured with the blade plate 84. The locking element 87 is corresponding to the positioning aperture 811, and the locking element 88 is corresponding to the connecting aperture 814.

When the operating arm 85 not pulled down, the spring 86 pulls down the blade plate 84, and the operating arm 85 is lifted up due to rotation generated by the driving teeth 843 correspondingly rotating the corresponding teeth 852. When an object is place in the containment space 812 of the cutting member 81, as shown in FIG. 10, the external force is applied onto the operating arm 85 to rotate the corresponding teeth 852 to drive the driving teeth 843, the blade plate 84 is driven by the driving teeth 843 to move into the containment space 812.

However, the above-mentioned structure has following problems: 1. The operating arm 85 provides only one side rotation which might cause uneven cutting strength. 2. In order to cut the object, the operating arm 85 needs to be rotated to allow the object to be placed in the containment space 812 of the cutting member 81, which causes heavy load to one of user's arm and requires inconvenient wide operating range.

Therefore, it is desirable to provide garden shears to mitigate and/or obviate the aforementioned problems.

SUMMARY OF THE INVENTION

An objective of the present invention is to provide garden shears with two operating arms.

In order to achieve the above mentioned objective, garden shears has a pair of overlapped engaging members, an anvil, a blade plate and two operating arms. The engaging member has a plurality of positioning apertures, at least two pivoting apertures, and a containment space form in an upper opening. The containment space has a closed top providing a resting portion for the anvil; the engaging member has two parallel protruding strips which form a guiding track in between. The blade plate has a positioning slot, a blade at an upper portion and an extending portion at a lower portion. A plurality of driving teeth are formed at two sides of the extending portion. A limiting member is respectively mounted onto a front and back side of the extending portion and slidably engages with the guiding track of the engaging member. The operating arm has a connecting aperture at one end, and a driving portion adjacent to the connecting aperture. An arced section with the driving portion is provided with corresponding teeth, and another of the operating arm is provided with a handle. The two engaging members are overlapped and combined together to form an inner space between the two engaging members. The anvil is accepted in the inner space and makes contact with the resting portion of the two engaging members. The blade plate is also accepting in the inner space of the two engaging members, the limiting member slidably engages with the guiding track of the two engaging members. The positioning slot of the blade plate is respectively secured onto the positioning apertures of the both engaging members, such that the blade plate is capable of sliding between the two engaging members. The connecting aperture of the operating arm is pivoted onto the pivoting aperture of the engaging member, such that the corresponding teeth of the two operating arms engage with the driving teeth on two sides of the blade plate.

With the above-mentioned structure, following benefits can be obtained: 1. The handles of two operating arms are used for providing even strength. 2. With two operating arms, a proper required operating strength of the operating arms can be much lower, which is less of burden for the user. 3. With two operating arms, a proper operating movement range of the operating arms can be much narrow, which is more convenient for the user.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
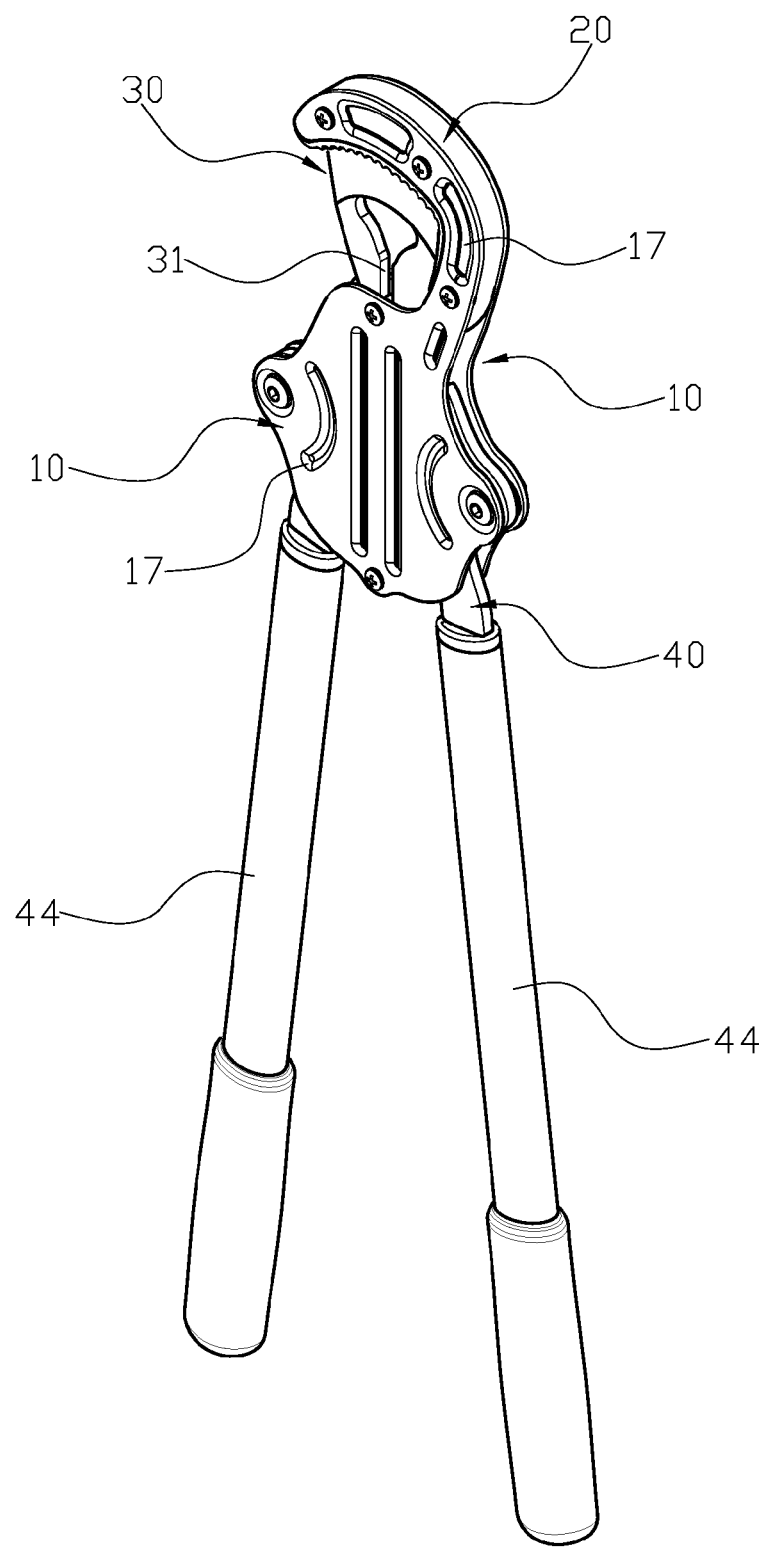
FIG. 1 is a perspective view of an embodiment of the present invention.
Figure 2:
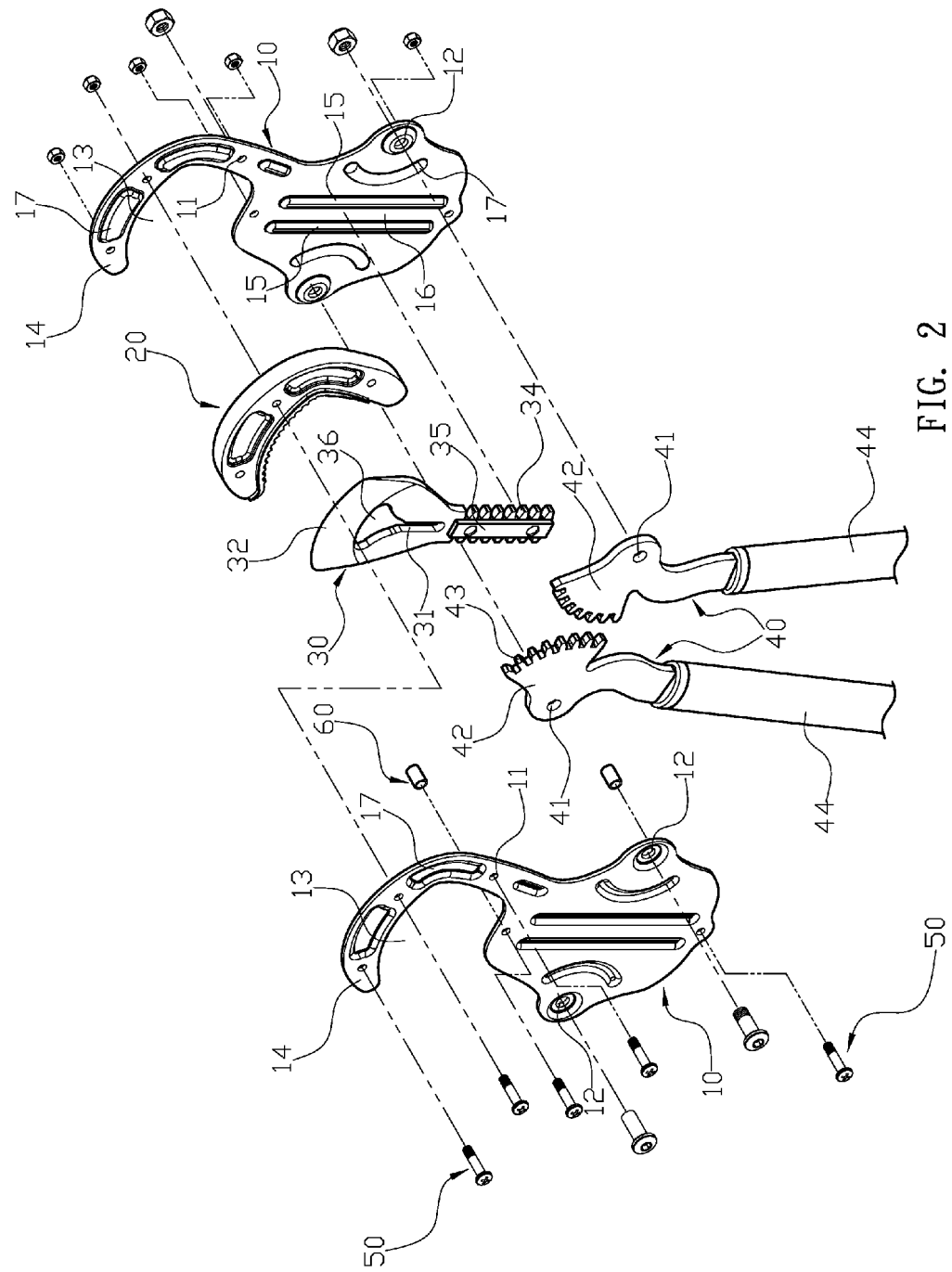
FIG. 2 is an exploded view of the embodiment of the present invention.
Figure 3:
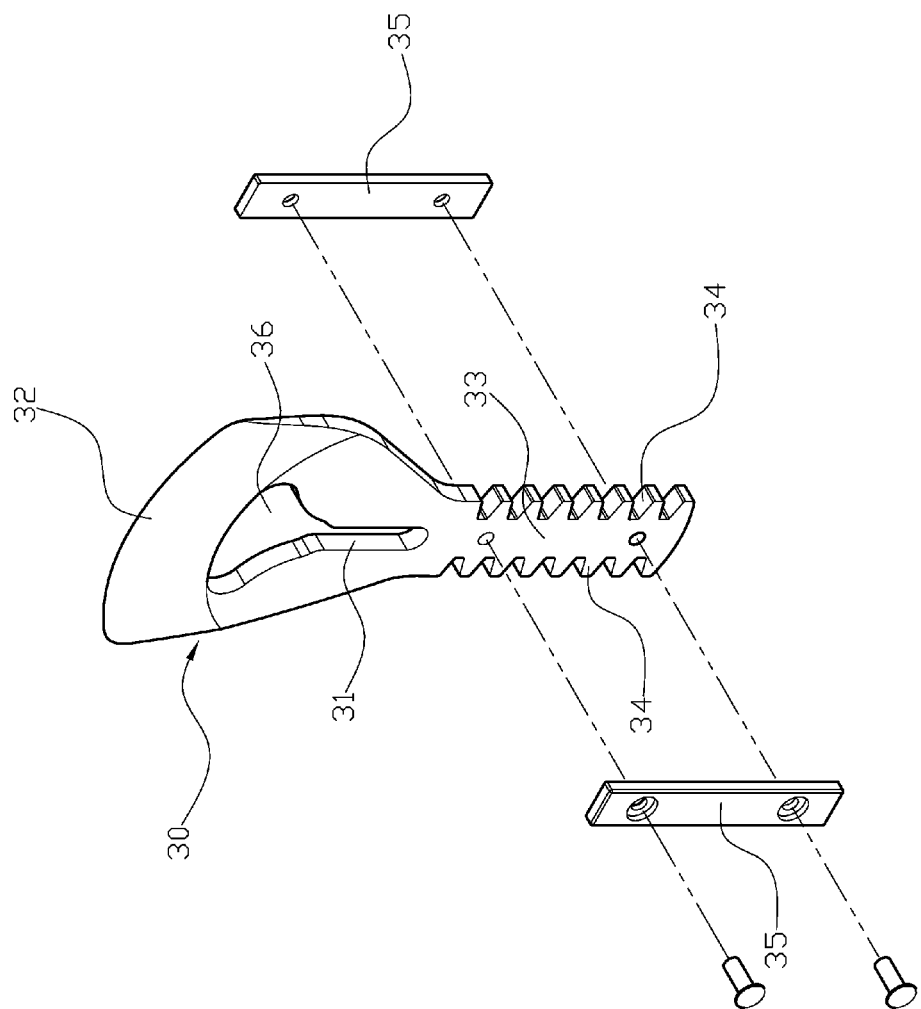
FIG. 3 is a detail view of the blade plate according to the embodiment of the present invention.
Figure 4:
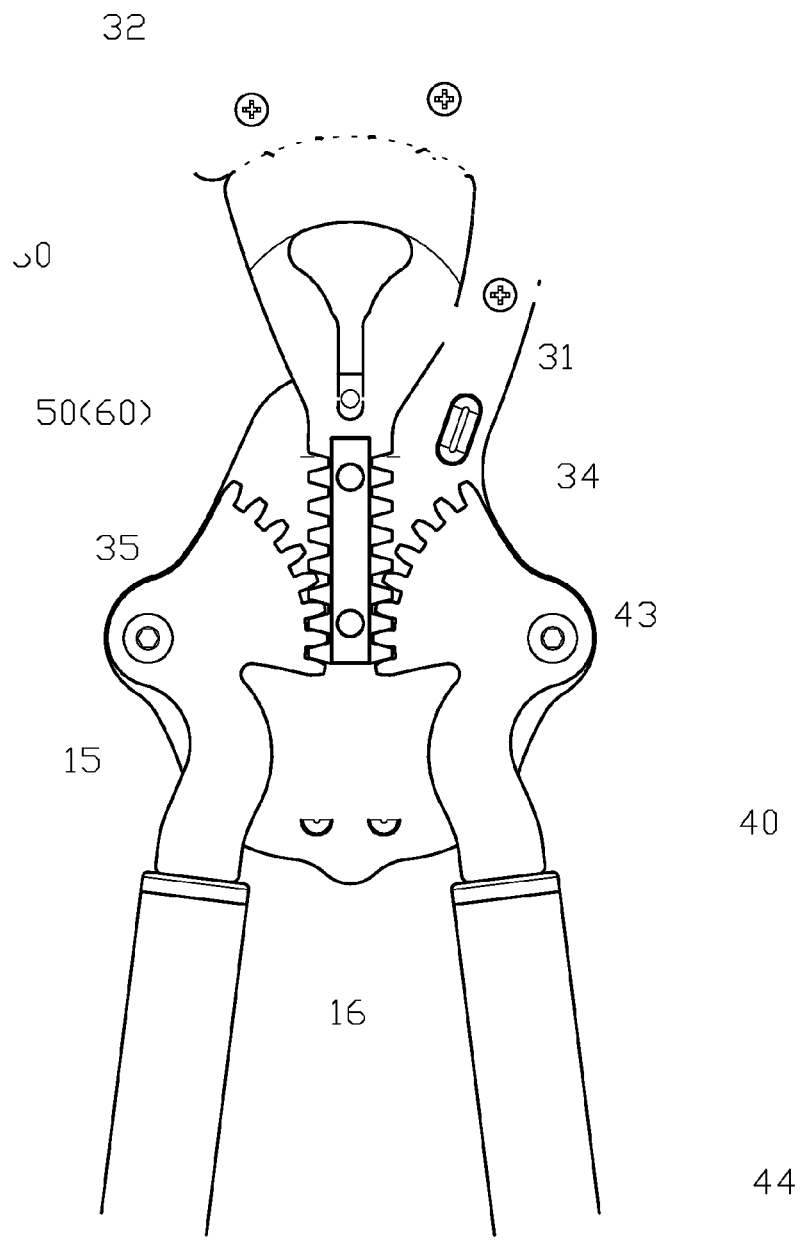
FIG. 4 is a front view of the embodiment of the present invention.

Please refer to FIG. 1, FIG. 2, FIG. 3 and FIG. 4. As shown in FIG. 1 to FIG. 3. Garden shears comprises a pair of overlapped engaging members 10, an anvil 20, a blade plate 30 and two operating arms 40. The engaging member 10 has a plurality of positioning apertures 11, at least two pivoting apertures 12, and a containment space 13 formed in an upper opening. The containment space 13 has a closed top providing a resting portion 14 for the anvil 20. The engaging member 10 has two parallel protruding strips 15 which form a guiding track 16 in between. The anvil 20 has a shape corresponding to a shape of the resting portion 14 of the engaging member 10. The blade plate 30 has a positioning slot 31, a blade 32 at an upper portion and an extending portion 33 at a lower portion. A plurality of driving teeth 34 are formed at two sides of the extending portion 33. A limiting member 35 is respectively mounted onto a front and back side of the extending portion 33 and slidably engages with the guiding track 16 of the engaging member 10. The operating arm 40 has a connecting aperture 41 at one end, and a driving portion 42 adjacent to the connecting aperture 41; an arced section with the driving portion 42 is provided with corresponding teeth 43, and another of the operating arm 40 is provided with a handle 44.

For assembly, as shown in FIG. 1 to FIG. 4, the two engaging members 10 are overlapped and combined together to form an inner space between the two engaging members 10. The anvil 20 is accepted in the inner space and makes contact with the resting portion 14 of the two engaging members 10. The blade plate 30 is also accepting in the inner space of the two engaging members 10, and the limiting member 35 slidably engages with the guiding track 16 of the two engaging members 10. The positioning slot 31 of the blade plate 30 is respectively secured onto the positioning apertures 11 of the both engaging members 10, such that the blade plate 30 is capable of sliding between the two engaging members. The connecting aperture 41 of the operating arm 40 is pivoted onto the pivoting aperture 12 of the engaging member 10, such that the corresponding teeth 43 of the two operating arms 40 engage with the driving teeth 34 on two sides of the blade plate 30. According, the swing movements of the two operating arms 40 control the cutting movements of the blade plate 30.

Figure 5:
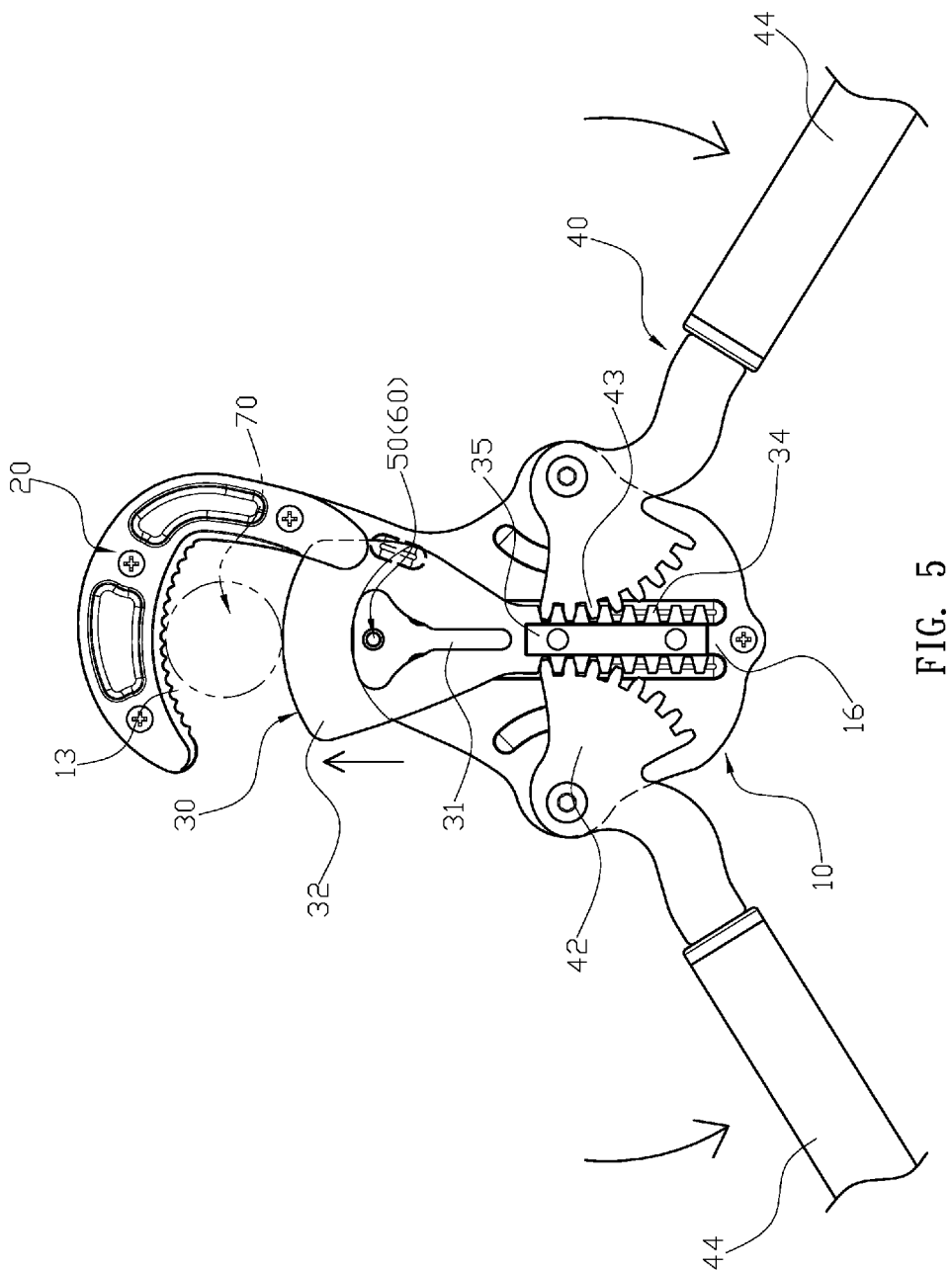
FIG. 5 is a schematic drawing showing the garden shears being ready to cut an object.
Figure 6:
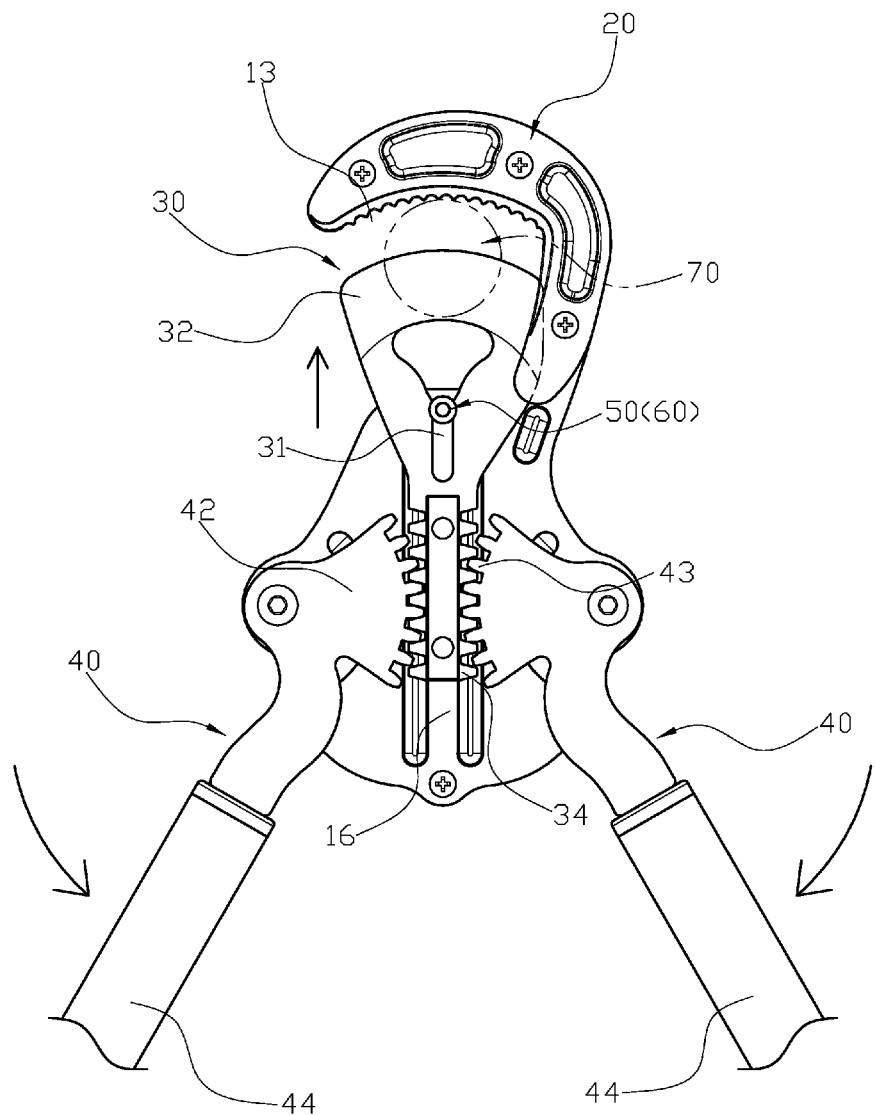
FIG. 6 is a status drawing of the garden shears cutting the object.
Figure 7:
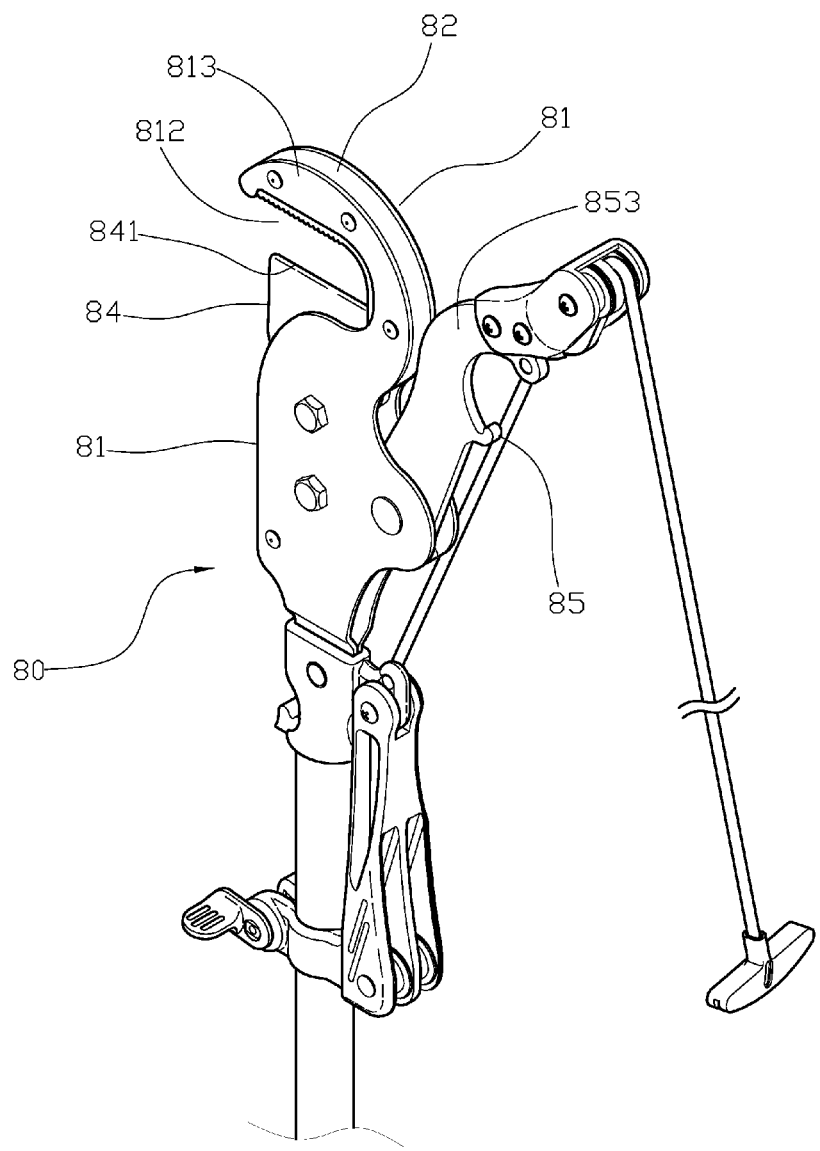
FIG. 7 is a perspective view of traditional garden shears.
Figure 8:
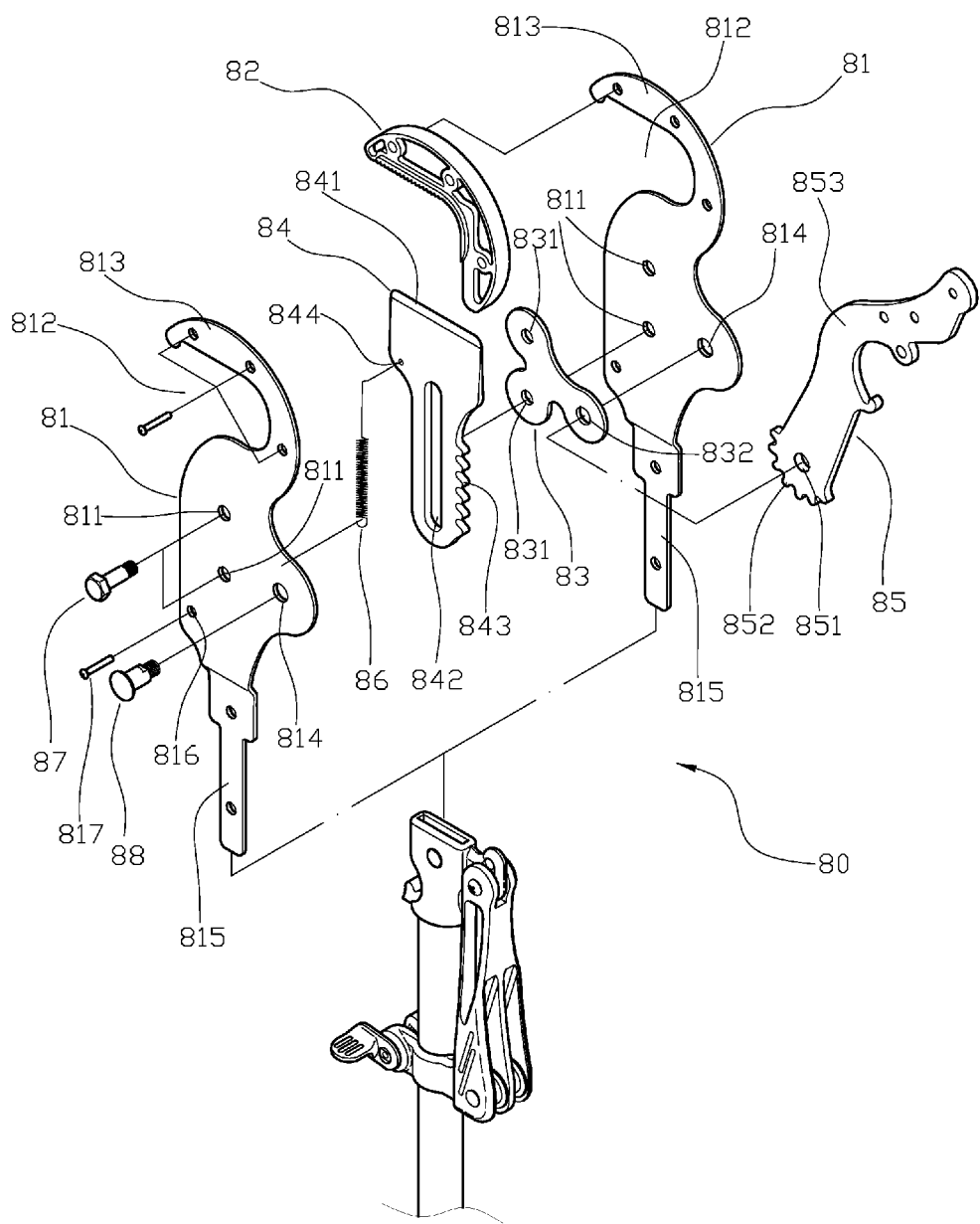
FIG. 8 is an exploded view of the traditional garden shears.
Figure 9:
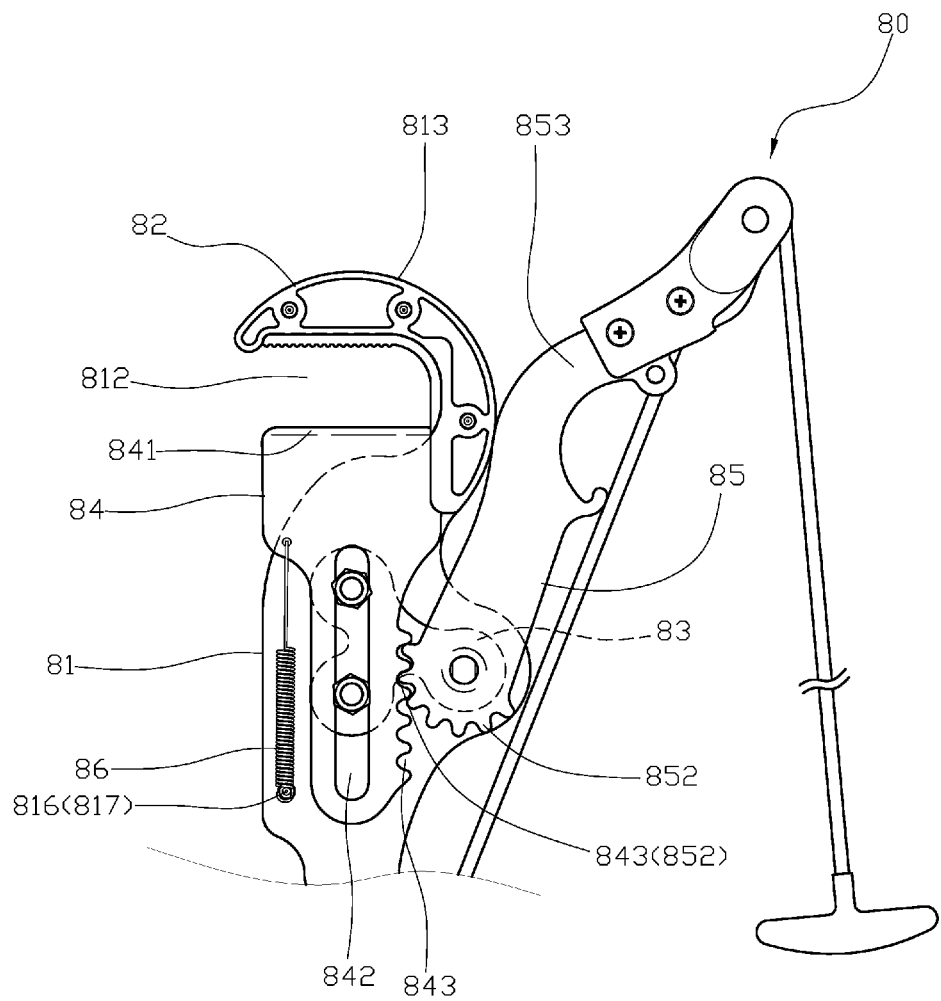
FIG. 9 is a front view of the traditional garden shears.
Figure 10:
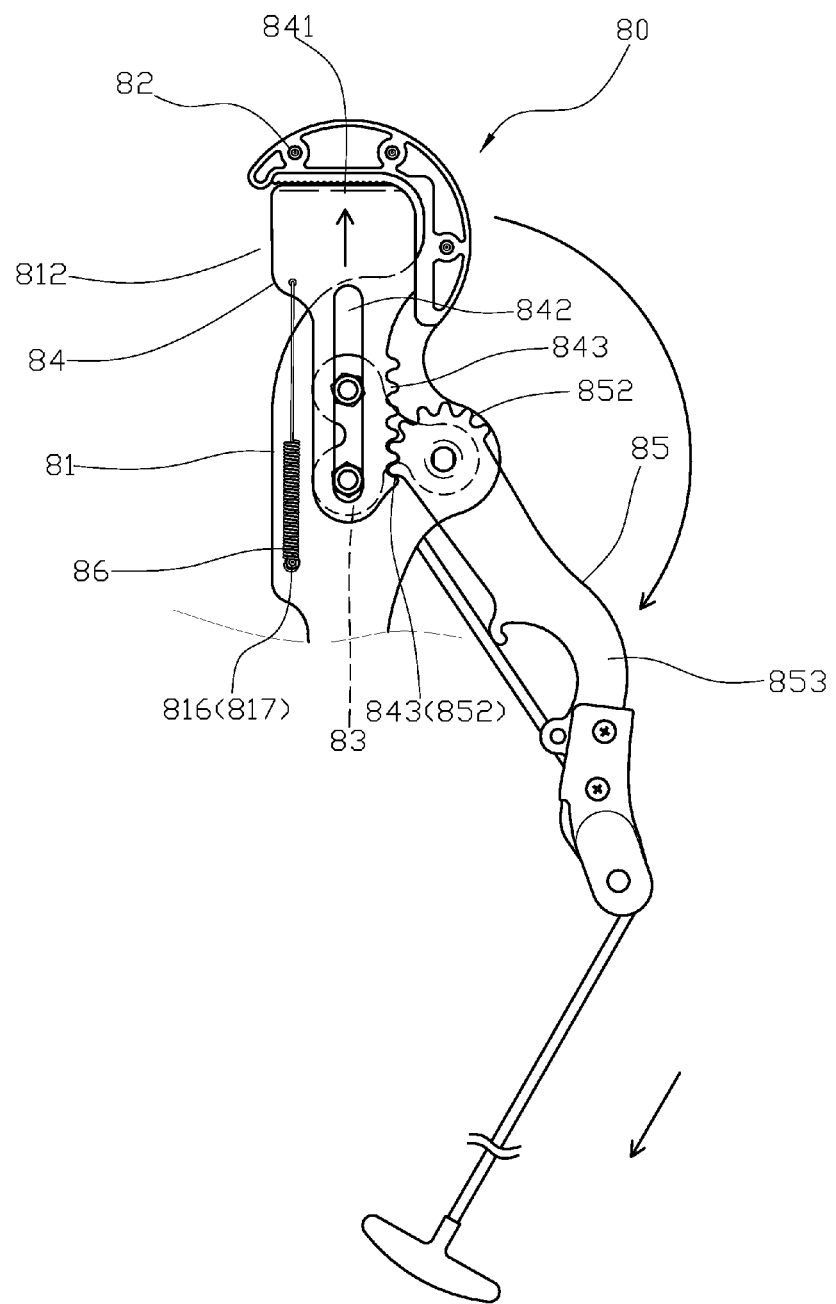
FIG. 10 is a status drawing of the traditional garden shears cutting the object.

As shown in FIG. 5 and FIG. 6. For actual operation, by opening apart the two operating arms 40 to move down the blade plate 30, the object 70 is able to be placed in the containment space 13 of the engaging member 10. When the two operating arms 40 are simultaneously pressed down, the corresponding teeth 43 drive the driving teeth 34 to move up the blade plate 30 due to the engagement between the positioning slot 31 and the sleeve 60, and the blade 32 moves into the containment space 13 to cut off the object 70 between the blade plate 30 and the anvil 20.

Moreover, the positioning slot 31 of the blade plate 30 further has an enlarged portion with an opening 36, and a plurality of ribs 17 are provided at predetermined positions on the engaging member 10 to enhance the durance of the engaging member 10.

With the above-mentioned structure, following benefits can be obtained: 1. The handles 44 of two operating arms 40 are used for providing even strength. 2. With two operating arms, a proper required operating strength of the operating arms 40 can be much lower, which is less of burden for the user. 3. With two operating arms, a proper operating movement range of the operating arms 40 can be much narrow, which is more convenient for the user.

Although the present invention has been explained in relation to its preferred embodiment, it is to be understood that many other possible modifications and variations can be made without departing from the spirit and scope of the invention as hereinafter claimed.

What is claimed is:

1. Garden shears having a pair of overlapping engaging members, an anvil, a blade plate and two operating arms, wherein
    each engaging member has a plurality of positioning apertures, at least two pivoting apertures, and a containment space formed in an upper opening;
    each containment space having a closed top providing a resting portion for the anvil; each engaging member further having at least two parallel protruding strips which form a guiding track;
    the blade plate has a positioning slot, a blade at an upper portion and an extending portion at a lower portion, a plurality of driving teeth formed along sides of the extending portion, and a limiting member mounted onto respective sides of the extending portion and slidably engaging with the guiding track of the engaging member;
    each operating arm has a connecting aperture at an end, and a driving portion adjacent to the connecting aperture, an arced section with the driving portion provided with corresponding teeth, and another end of the operating arm is provided with a handle; and
    the two engaging members are overlapped and combined together to form an inner space between the two engaging members, the anvil is in the inner space and makes contact with the resting portion of the two engaging members, the blade plate is also in the inner space of the two engaging members, the limiting member slidably engages with the guiding track of the two engaging members, the positioning slot of the blade plate is respectively secured onto the positioning apertures of both engaging members, such that the blade plate is capable of sliding between the two engaging members, and the connecting aperture of the operating arm is pivoted onto the pivoting aperture of the engaging member, such that the corresponding teeth of the two operating arms engage with the driving teeth on two sides of the blade plate,
    wherein an upper enlarged portion of the positioning slot of the blade plate is provided with an opening.

2. The garden shears as claimed in claim 1, wherein the anvil has a shape corresponding to a shape of the resting portion of the engaging members.

3. The garden shears as claimed in claim 1, wherein a sleeve is provided for a securing member of the positioning slot.

4. The garden shears as claimed in claim 1, wherein a plurality of ribs are provided at predetermined positions on each engaging member.

* * * * *